United States Patent [19]

Kupisiewicz et al.

[11] 4,442,368
[45] Apr. 10, 1984

[54] ROTATING ELECTRICAL MACHINE

[76] Inventors: Stefan Kupisiewicz, 55, rue Bois d'Evegnée; Jacques J. F. Schoebrechts, 61, Chaussée de Wégimont, both of 4634 Soumagne, Belgium

[21] Appl. No.: 477,587

[22] Filed: Mar. 21, 1983

Related U.S. Application Data

[63] Continuation of Ser. No. 199,357, Oct. 21, 1980, abandoned.

[30] Foreign Application Priority Data

Apr. 25, 1980 [BE] Belgium ................. 2/58536
Sep. 30, 1980 [BE] Belgium ................. 2/58779

[51] Int. Cl.³ .............................................. H02K 3/04
[52] U.S. Cl. ................................. 310/201; 310/184; 310/162; 310/211
[58] Field of Search ...................... 310/198–208, 310/180, 182, 184, 197, 159, 162, 211, 179

[56] References Cited

U.S. PATENT DOCUMENTS

| 2,790,098 | 4/1957 | Nyyssonen | 310/202 |
| 2,790,099 | 4/1957 | Nyyssonen | 310/202 |
| 3,321,653 | 5/1967 | Sonoyama | 310/180 |
| 3,518,473 | 6/1970 | Nordebo | 310/180 |
| 3,594,595 | 7/1971 | Williams | 310/201 |
| 3,629,636 | 12/1971 | Hill | 310/184 |

FOREIGN PATENT DOCUMENTS 712372  7/1954  United Kingdom ............... 310/184

Primary Examiner—R. Skudy
Attorney, Agent, or Firm—Bacon & Thomas

[57] ABSTRACT

Rotating electrical machine of the type comprising a stationary portion and a moving portion coaxial therewith, the stationary portion carrying a first and a second windings, while the moving portion has a third winding, characterized in that said third winding consists of a number of bar sets each of which comprises two interconnected bars, the said number of bar sets being either equal to the number of pole pairs of the stator winding having the largest pole pitch in the case of a one-phase rotor, or equal to three times said number of pole pairs in the case of a three-phase rotor.

16 Claims, 9 Drawing Figures

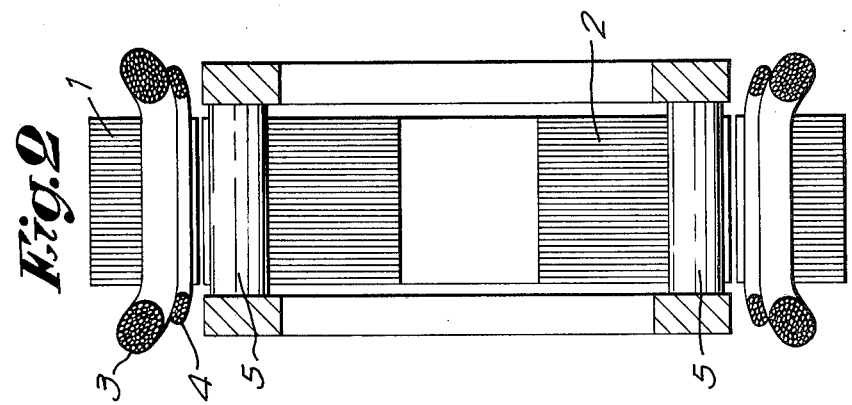
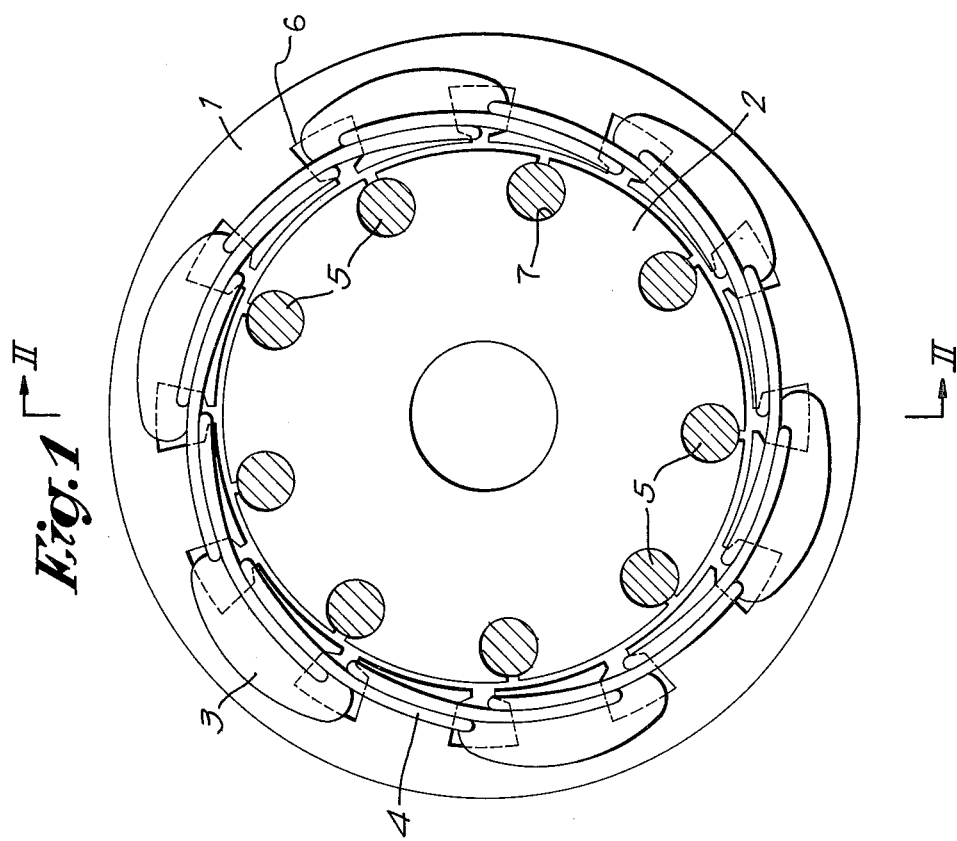

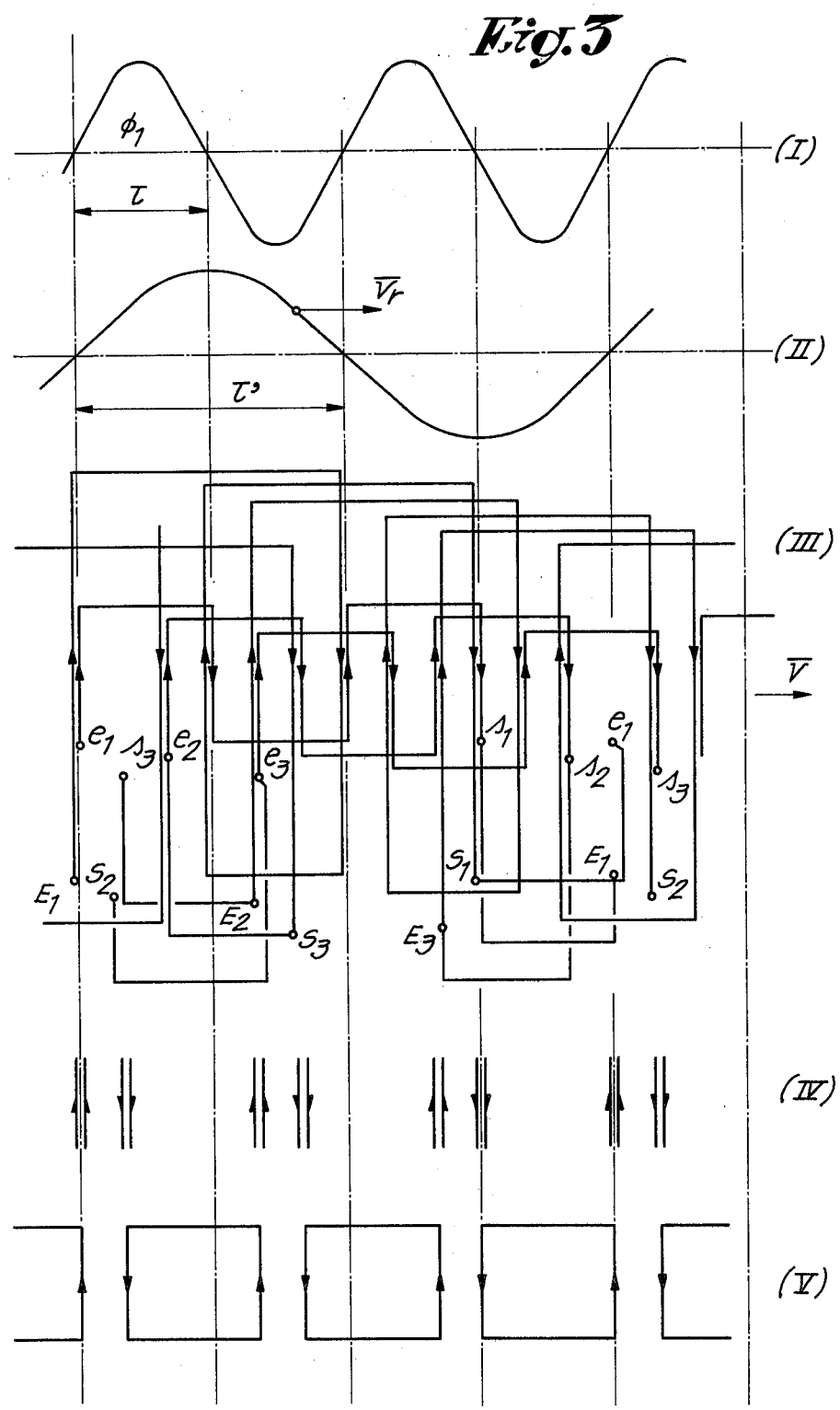

ROTATING ELECTRICAL MACHINE

This is a continuation of application Ser. No. 199,357, filed Oct. 21, 1980 now abandoned.

This invention relates to a rotating electrical machine which may be made as a synchronous alternator, synchronous, asynchronous or synchronized asynchronous motor.

Most machines of that type, more particularly those having a relatively low power are provided with ring and brush collectors in spite of the numerous drawbacks of the latter: wear, contact losses, sparks, etc. . . . In fact, the addition of an energizer would unduly increase the cost price thereof.

For illustrating the foregoing, it may be mentioned that all the automobile vehicles of mass production are presently still equipped with ring and brush alternators in spite of the substantial advantages which would be obtained by suppressing the latter.

Other techniques (permanent magnets, immobilization of the inductor, variable reluctance machines, coiled rotors, etc. . . ) have been developed, but the realization thereof leads to such technological intrications that they are restricted to very particular cases of the market (explosive or particularly corrosive atmospheres . . . ).

Among said techniques and according to the present state of technique (see British Pat. No. 712,372), there is known a rotating electrical machine of the type comprising a stationary portion and a moving portion coaxial therewith, wherein the stationary porton comprises a first and a second windings, while the moving portion has a third winding, the first and second windings having pole pitches which are even multiple or sub-multiple of each other and a mutual zero inductance, the third winding being alone and closed on itself, the arrangement being such that the first winding may generate a field inducing currents within the third winding, said currents generating an inducing field in a rotation relative to the stationary portion and having the same pole pitch as the second winding and magnetically interacting with the latter.

Said alternator has numerous drawbacks, namely:

a substantial complexity of the rotor coil resulting in a prohibitive cost price of the machine for the mass production thereof;

owing to the presence of a complex rotor coil, it is not possible to use high rotating speeds and thus to obtain substantial mass powers;

the well known reduced reliability of a coiled rotor machine.

The purpose of the present invention is to provide a machine without any ring or brush collector wherein the above-mentioned drawbacks are not at all existing.

More particularly, the object of the present invention is to provide a rotating machine of the intended type fulfilling two different functions in a same magnetic circuit and the rotor of which is drastically simplified.

For this purpose, a machine according to this invention of the type comprising a stationary portion and a moving portion coaxial therewith is substantially characterized in that the stationary portion carries a first and a second windings, while the moving portion has a third winding, the first and second windings having pole pitches which are even multiple or sub-multiple of each other and a mutual zero inductance, the third winding being alone and closed on itself, the arrangement being such that the first winding may generate a field inducing currents in the third winding, said currents generating an inducing field in a rotation relative to the moving portion and having the same pole pitch as the second winding and magnetically interacting with the latter, characterized in that said third winding comprises a number of bar sets each of which comprises two interconnected bars, the said number of bar sets being either equal to the number of pole pairs of the stator coil having the largest pole pitch in the case of a one-phase rotor, or equal to three times said number of pole pairs in the case of a three-phase embodiment.

As it will be more clearly apparent from the following description, while allowing to fulfil different functions in the same magnetic circuit, said arrangements are also allowing namely to reduce the iron and copper requirements relative to the state of technique, the moving portion being realized according to a technique similar to that of a cage asynchronous rotor.

The present invention will be described hereafter more clearly and with more details, reference being made to the enclosed drawings in which:

FIG. 1 shows diagrammatically a machine according to this invention;

FIG. 2 is a section taken on the line II—II of FIG. 1; and

FIGS. 3 to 6 explain how to provide the rotor of a machine according to the invention.

Figure 7:
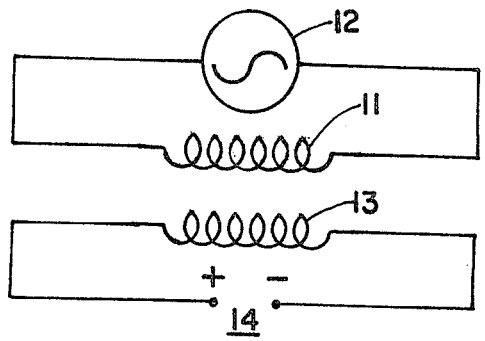

FIG. 7 is a schematic diagram of a synchronous motor embodiment of the present invention.

Figure 8:
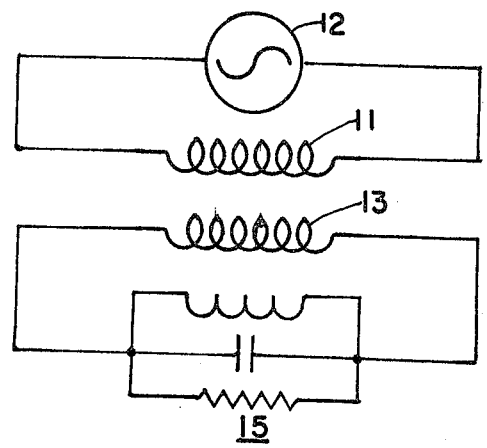

FIG. 8 is a schematic diagram of an asynchronous embodiment of the present invention.

Figure 9:
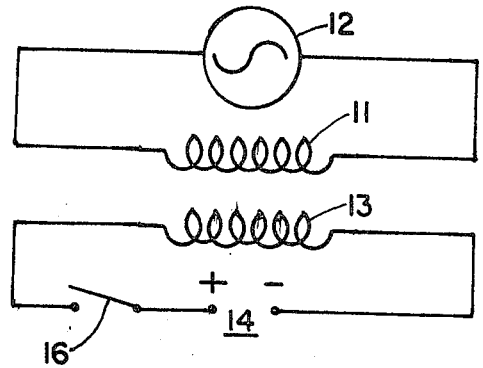

FIG. 9 is a schematic diagram of an asynchronous synchronized embodiment of the present invention.

The machine shown in FIGS. 1 and 2 is a synchronous alternator comprising a stationary portion or stator 1 and a moving portion or rotor 2 which are concentric to each other and made of laminated magnetic sheets. In this embodiment, the stator 1 comprises twelve notches 6, while the rotor has nine notches 7.

The stator 1 carries a first winding 3 consisting of six coils having a pole pitch $\tau$, as well as a second two-phase winding 4 consisting of two times three coils having a pole pitch $\tau'=2\tau$.

The mutual inductance between windings 3 and 4 is zero.

The rotor 2 carries nine bar sets 5 each of the bars of a set are common to two successive bar sets forming a squirrel cage.

For functioning as an alternator, an energizing direct current is injected into the first winding 3, while the rotor 2 is driven at a speed $\eta$ (t/sec.).

The energizing current generates a fixed flux $\Phi_1$ having a pole pitch $\tau$ relative to the stator and said flux induces, within bar sets 5, currents having a frequency $f_1 = p_1 \cdot \eta$, $2p_1$ being the number of the so formed poles (twelve in this embodiment).

Owing to a suitable and particular arrangement of said rotor bar sets 5, said currents having a frequency $f_1$ are generating:

1. a magnetomotive force $mmF_1$ having a pole pitch $\tau$ rotating in the opposite direction to rotor 2 and working to substantially reduce the flux $\Phi_1$ like in a short-circuited alternator;

2. a magnetomotive force $mmF_2$ rotating in the same direction as the rotor 2 and having, in this embodiment, a pole pitch $\tau'=2\tau$, with a number of pole pairs $p_2=(p_1/2)$.

The relative rotating speed of mmF$_2$ relative to the rotor 2 is $\eta_T=(f_1/p_2)$.

Said mmF$_2$ meets the coil 4 of the stator 1 at a speed equal to $$\eta_2 = \eta + \eta_T = \left(1 + \frac{p_1}{p_2}\right)\eta.$$

Thus, in this embodiment, $\eta_2=3$.

Accordingly, the linear speed of said mmF$_2$ is very high and owing to the small number of rotor notches and the substantial toothing surfaces, the value of the flux $\Phi_2$ generated by said mmF$_2$ is also very high since the air gap induction may readily reach values of the order of 1.1 T. In addition, the pole pitch is doubled.

The frequency of the electromotive forces generated within coil 4 is equal to $f_2=(p_1+p_2)\eta$.

The above described characteristics are leading to a coil 4 in which the number of turns necessary to induce a given electromotive force is substantially reduced relative to the state of technique. In addition, the armature reactions are reduced in the same ratio, thereby favorably influencing the winding 3.

It should be also noted that the drastic simplicity of the rotor leads to a machine in which the limit rotating speeds may be very high. This aspect contributes also to provide a machine having a very high mass power.

In the foregoing, it has been said that the rotor bar sets 5 must be judiciously disposed. This is explained hereafter with reference to FIGS. 3 to 6.

Given an inducing stator generating a flux $\Phi_1$ as shown diagrammatically by several poles having a pole pitch $\tau$ (FIG. 3-I) and a three-phase rotor with a notch per pole and per phase the monoturn coil of which is represented by e1-s1, e2-s2, e3-s3 (FIG. 3-III). Said coil is the seat of three-phase electromotive forces having a frequency $f_1=V/2\tau$, V being the linear speed of the rotor relative to the stator.

The output of said coil e-s is connected with a second non diametral monoturn coil shown by E$_1$-S$_1$, E$_2$-S$_2$, E$_3$-S$_3$ and having a pole pitch $\tau'=2\tau$. Said second coil is arranged so that it will be traversed by currents induced within coil e-s and it is the seat of a magnetomotive force rotating in the same direction as the rotor at a relative speed $v\tau=2\tau'f$.

The total speed of said magnetomotive force relative to the stator is equal to $v+v\tau=2\tau f+2\tau'f$ and, since in the considered case, we have $\tau'=2\tau$, $$v+v\tau=2\tau f+4\tau f=6\tau f=3v.$$

When considering FIG. 3 (III), it may be noted that the mutual inductance between e and E is zero and that some notches are traversed by currents having the same phase and amplitude, but in opposite direction owing to the arrangement of the coils according to the invention. Thus, at the level of the active portions, the coil may be reduced to the configuration shown in (IV) on FIG. 3, wherein it has been possible to suppress some notches together with the conductors thereof. Finally, the return path of the conductors being unimportant, the winding is reduced to that indicated in (V) on FIG. 3, wherein both starting coils are merged. This arrangement has numerous advantages:

simplification of the rotor coil;
reduction of the amount of copper or aluminium being used;
substantial increase of the flux which may be canalized;
substantial reduction of the rotor reactances;
coil reduced to some bars confined within the same magnetic circuit.

The magnetomotive force being thereby generated within the rotor bars by varying flux $\Phi_1$ comprised actually a component having a pole pitch $\tau$ moving at a speed $(-v)$ and demagnetizing the flux $\Phi_1$ it has generated, but said magnetomotive force comprises also a component having a pole pitch $\tau'=2\tau$ moving in the same direction as the rotor at a relative speed equal to $vr=2v$, so that a wave of magnetomotive force having a pole pitch $\tau'=2\tau$ passes through the stator at a speed $3v$.

Said magnetomotive force having a pole pitch $\tau'=2\tau$ generates an induction and accordingly a flux $\Phi_2$ meeting a coil having a pole pitch $\tau'$, which will be the seat of the output electromotive forces of the alternator. Owing to the configuration of the coils (pole pitch of even multiples), the same flux will not produce electromotive force within the energizing coil (or more precisely the total sum of electromotive forces is zero).

Figure 4:
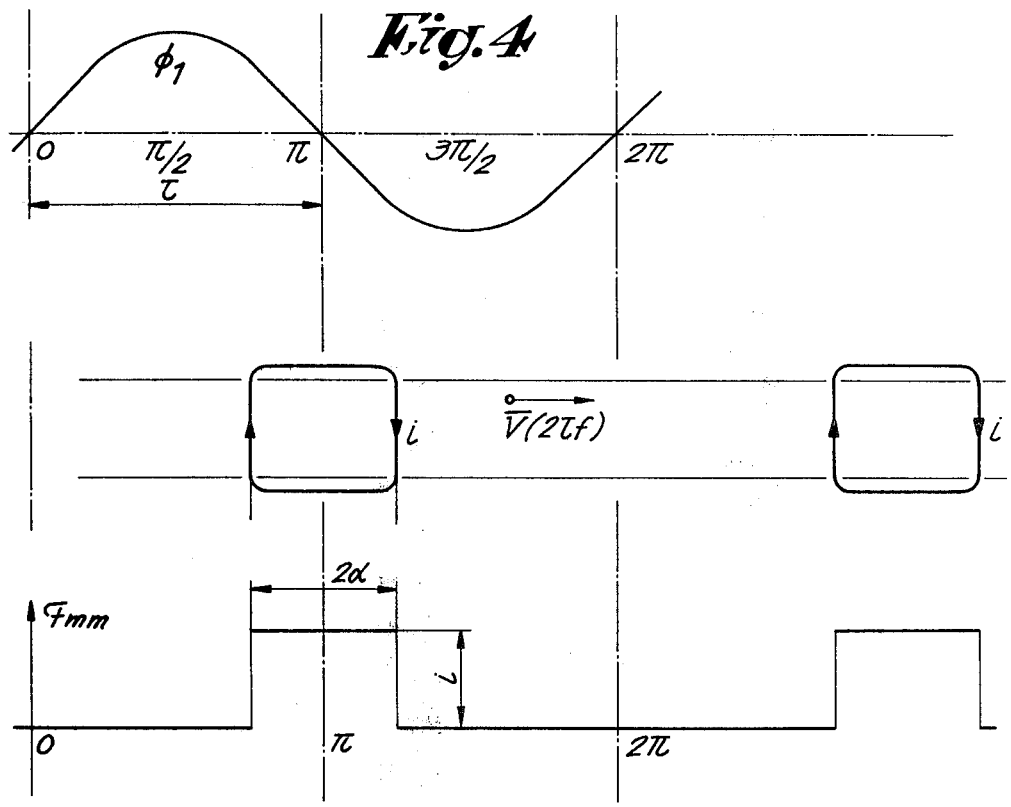

In order to extend the foregoing, a rotor made as shown in FIG. 4 may be taken into consideration. In relation with said rotor, the stator will comprise p pairs of poles having a pitch $\tau$, said pole pairs may comprise indifferently:

A. An inducing coil having a pole pitch $\tau$ and a monophase or multi-phase induced coil having a pole pitch $\tau/2$.

B. A monophase or multi-phase induced coil having a pole pitch $\tau$ and an inductor having a pole pitch $\tau/2$.

It should be noted that in both cases, said both coils have a mutual zero inductance, while the rotor comprises p bar sets (each bar set constituting a closed turn the angular opening of which is equal to $2\alpha$ (FIG. 4b)).

VERSION A

The travel of the p bar sets at a speed v in the induction of the p poles of the stator induces therein a current of the form:

$i=I\max\sin\omega(t-to)$

If to is selected so that, when $t=o$
$i=I\max$, the current passing through each bar set is $i=I\max\sin\omega t.$ The magnetomotive force (m.m.F.) has the configuration given in FIG. 4c.

When decomposed in Fourier series, said magnetomotive force may be written as:

$$m.m.F. = \frac{2i}{\pi}\sum_{\gamma=1}^{n}\frac{(-1)^\gamma}{\gamma}\cdot\sin\gamma\alpha\cdot\cos\gamma\frac{\pi x}{\tau}$$

Given then p.q rotor bar sets spaced of $2\tau/q$ constituting a q phased system supposed direct in its numbering (with $2\alpha\leq 2\tau/q$).

The development into a Fourier series of the $j^{th}$ bar set will have the form $$m.m.F._j = \frac{2i}{\pi}\sum_{\gamma=1}^{n}\frac{(-1)^\gamma}{\gamma}\cdot\sin\gamma\alpha\cdot$$

-continued $$\cos \gamma \left[ \frac{\pi x}{\tau} - (j - 1) \frac{2\pi}{q} \right]$$

If, as previously described, to is selected so that the current passing through the 1$^{st}$ bar set be equal to $i_1 = I$ max sin $\omega t$, then $i_j = I$ max.sin $[\omega t - (j-1)2\pi/q]$ Let us then consider the fundamental harmonic ($\gamma = 1$) of the development in Fourier series of q bar sets and let us determine the resulting magnetomotive force and consequently its action on the coil having a pole pitch $\tau$.

There is obtained:

$$\underset{\gamma=1}{mmF} = - \left( \frac{2 I \max}{\pi} \right) \sum_{j=1}^{q} \sin\alpha \cdot \sin\left[ \omega t - (j-1) \frac{2\pi}{q} \right] \cdot$$

$$\cos\left[ \frac{\pi x}{\tau} - (j-1) \frac{2\pi}{q} \right] =$$

$$- \frac{2 I \max}{2\pi} \sum_{j=1}^{q} \sin\left[ \omega t - \frac{\pi x}{\tau} \right] +$$

$$\sin\left[ \omega t + \frac{\pi x}{\tau} - 2(j-1) \frac{2\pi}{q} \right]$$

thus $$\underset{\gamma 1}{mmF} = - \frac{I\max \cdot q}{\pi} \sin\alpha \cdot \sin\left[ \omega t - \frac{\pi x}{\tau} \right] -$$

$$\frac{I\max \cdot \sin\alpha}{\pi} \sum_{\gamma=1}^{q} \sin\left[ \omega t + \frac{\pi x}{\tau} - 2(j-1) \frac{2\pi}{q} \right]$$

it is known that:

$$\sum_{j=1}^{q} \sin[\beta + (j-1)\delta] = \sin\left[ \beta + (q-1) \frac{\delta}{2} \right] \cdot \frac{\sin q \cdot \frac{\delta}{2}}{\sin \frac{\delta}{2}}$$

It is immediately seen that:
(a) $q > 2$, the sum contained in the second member of m.m.F. is identically zero. $\gamma = 1$
Then, we have:

$$\underset{\gamma=1}{m.m.F.} = - \frac{I \max \cdot \sin\alpha \cdot q}{\pi} \sin\left( \omega t - \frac{\pi x}{\tau} \right)$$

which constitutes a magnetomotive force having an amplitude $$\frac{I \max \cdot \sin\alpha \cdot q}{\pi}$$

rotating in the opposite direction to the rotor at a speed v and thus fixed relative to the stator inducing field having a pole pitch $\tau$. This magnetomotive force constitutes then an armature reaction.

(b) $q = 2$.
There is obtained:

$$\underset{\gamma=1}{m.m.F.} = - \frac{I \max \cdot \sin\alpha}{\pi} \cdot 2 \cdot$$

$$\left[ \sin\left( \omega t - \frac{\pi x}{\tau} \right) + \sin\left( \omega t + \frac{\pi x}{\tau} \right) \right]$$

which corresponds to a pulsating magnetomotive force having a pole pitch $\tau$ decomposing into one term corresponding to an armature reaction (like in the case $q > 2$), the other term producing, within the stator, a pulsating magnetomotive force which is a substantial nuisance for the inductor and which can be suppressed (when the inductor is fed with a direct current) only by means of a stator cage having a pole pitch $\tau$.

(c) $q = 1$.
Same result as with $q = 2$, the amplitude being reduced by half for the same current in the bars.

Let us consider then the harmonic corresponding to $\gamma = 2$ in the development in Fourier series of q bar sets and let us determine the resulting magnetomotive force and its action on the coil having a pole pitch $\tau/2$.

We have $$\underset{\gamma=2}{m.m.F.} = \frac{I\max}{\pi} \cdot \sum_{j=1}^{q} \sin 2\alpha \cdot \left[ \sin \omega t - (j-1) \frac{2\pi}{q} \right] \cdot$$

$$\cos 2 \left[ \frac{\pi x}{\tau} - (j-1) \frac{2\pi}{q} \right]$$

then $$\underset{\gamma 2}{mmF} = \frac{I\max \cdot \sin 2\alpha}{2\pi} \sum_{j=1}^{q} \sin\left[ \omega t - \frac{2\pi x}{\tau} + (j-1) \frac{2\pi}{q} \right] +$$

$$\sum_{j=1}^{q} \sin\left[ \omega t + \frac{2\pi x}{\tau} - 3(j-1) \frac{2\pi}{q} \right]$$

As previously described, it is readily seen that:
(a) the first summation is identically zero, except for $q = 1$
(b) the second summation is identically zero, except for $q = 1$ and $q = 3$.

From the foregoing, it results that the sole acceptable values of q to cause an interaction between the coils having a pole pitch $\tau$ and $\tau/2$, are limited to values of $q = 1$ and $q = 3$.

When $q = 3$, there is finally obtained $$\underset{\gamma 2}{m.m.F.} = \frac{I \max \cdot \sin 2\alpha}{2 \cdot \pi} \cdot 3 \sin\left[ \omega t + \frac{2\pi x}{\tau} \right]$$

which corresponds to a magnetomotive force having a pitch $\tau/2$ rotating in the same direction as the rotor at a speed $v/2$ and accordingly sweeping the induced coil having a pole pitch $\tau/2$ at a speed $v + v/2$, which will be then the seat of the output electromotive forces.

For $q = 1$ we should have $$\underset{\gamma 2}{mmF} = \frac{I \max \cdot \sin 2\alpha}{2\pi} \left[ \sin\left( \omega t + \frac{2\pi x}{\tau} \right) + \right.$$

-continued $$\sin\left(\omega t - \frac{2\pi x}{\tau}\right)\Bigg]$$

corresponding to a pulsating magnetomotive force relative to the rotor, decomposing into two magnetomotive forces having an amplitude $$\frac{I \max \sin \cdot 2x}{2\pi}$$

rotating in opposite directions at a speed v/2 relative to the rotor, said magnetomotive forces sweeping the induced coil of the stator (pitch $\tau/2$) at a speed $v+v/2$ for the first one and at a speed $v-v/2$ for the second one and inducing therein two electromotive forces having different frequencies and amplitudes.

VERSION B

When keeping the same rotor arrangement, let us suppose now that the stator is provided with 2 p pairs of inducing poles having a pole pitch $\tau/2$ and a monophase or multiphase induced coil having a pole pitch $\tau$. If the relative speed of the stator with respect to the rotor is kept (v), when proceeding as previously described, we will have:

$$i_j = I \max \sin\left[2\omega t - 2(j-1)\frac{2\pi}{q}\right]$$

By determining the resulting harmonic corresponding to $\gamma=1$ (and consequently its action on the induced coil having a pole pitch $\tau$), there is obtained:

$$mmF_{\gamma=1} = -\frac{2I\max \cdot \sin\alpha}{\pi} \sum_{j=1}^{q} \sin\left[2\omega t - 2(j-1)\frac{2\pi}{q}\right] \cdot$$

$$\cos\left[\frac{\pi x}{\tau} - (j-1)\frac{2\pi}{q}\right] =$$

$$\frac{I\max \sin\alpha}{\pi}\left[\sum_{j=1}^{q} \sin\left(2\omega t + \frac{\pi x}{\tau} - 3(j-1)\frac{2\pi}{q}\right) +\right.$$

$$\left.\sum_{j=1}^{q} \sin\left(2\omega t - \frac{\pi x}{\tau} - (j-1)\frac{2\pi}{q}\right)\right]$$

It is readily seen that:
(a) the first sum is identically zero, except for $q=1$ and $q=3$.
(b) the second sum is zero, except for $q=1$. If $q=3$ $$mmF_{\gamma=1} = -\frac{I\max \cdot \sin\alpha}{\pi} \cdot 3 \sin\left(2\omega t + \frac{\pi x}{\tau}\right)$$

which corresponds to a magnetomotive force having an amplitude $$\frac{3 I \max \cdot \sin\alpha}{\tau}$$

with a pole pitch $\tau$ rotating relative to the rotor at a speed 2v and sweeping the induced coil having a pole pitch $\tau$ at a speed 3v, which will be then the seat of the output electromotive forces.

If $q=1$ $$mmF_{j=1} =$$

$$-\frac{I\max \cdot \sin\alpha}{\pi}\left[\sin\left(2\omega t + \frac{\pi x}{\tau}\right) + \sin\left(2\omega t - \frac{\pi x}{\tau}\right)\right]$$

In that case, we observe that the induced coil having a pole pitch $\tau$ is swept by two magnetomotive forces the relative speeds of which with respect to said coil are respectively 3v and $-v$. The electromotive force induced in said coil will be the resultant of two electromotive forces having different amplitudes and frequencies.

Let us then consider the influence of the resultant of the magnetomotive forces on the inducing coil having a pole pitch $\tau/2$.

$$m.m.F._{\gamma=2} = \frac{I \max \sin 2\alpha}{\pi} \sum_{j=1}^{q} \sin\left[2\omega t - 2(j-1)\frac{2\pi}{q}\right] \cdot$$

$$\cos\left[\frac{2\pi x}{\tau} - 2(j-1)\frac{2\pi}{q}\right]$$

Finally, there is obtained:

$$m.m.F._{\gamma=2} = I \max \cdot \sin 2\alpha \cdot q \cdot \sin\left(2\omega t - \frac{2\pi x}{\tau}\right) +$$

$$\frac{I\max \cdot \sin 2\alpha}{2\pi} \sum_{j=1}^{q} \sin\left[2\omega t + \frac{2\pi x}{\tau} - 4(j-1)\frac{2\pi}{q}\right]$$

As previously described, it will be observed that the second term is zero, except for $q=1,2,4$. Thus, two solutions are to be held.

$$1° - q = 3.$$

$$m.m.F._{\gamma=2} = \frac{3 I \max}{2\pi} \cdot \sin 2\alpha \cdot \sin\left(2\omega t - \frac{2\pi x}{\tau}\right)$$

This corresponds to a magnetomotive force having an amplitude $3/2\pi I$ max.sin $2\alpha$ rotating in the opposite direction to the rotor at a speed v and consequently fixed relative to the inducing coil; thus, its action will be equivalent to an armature reaction.

$$2° - q = 1.$$

$$mmF_{\gamma=2} = \frac{I \max \cdot \sin 2\alpha}{2\pi}\left[\sin\left(2\omega t - \frac{2\pi\alpha}{\tau}\right) +\right.$$

$$\left.\sin\left(2\omega t + \frac{2\pi\alpha}{\tau}\right)\right]$$

This corresponds to a pulsating field within the rotor, decomposing into a direct and inverse magnetomotive force having a relative speed v with respect to the rotor.

One of said magnetomotives forces will behave as a armature reaction (fixed relative to the stator), while the other magnetomotive force will induce a troublesome electromotive force into the inducing coil.

REMARKS: A similar reasoning scheme would allow to determine the influences of harmonics of higher order on the various windings.

It was the purpose of the previous theoretical considerations to show that, according to the present invention, it was possible to provide a rotating machine fulfilling two different functions in a same magnetic circuit and the rotor of which is, according to the above described theory, drastically simplified.

It has been possible to replace the relatively complex rotor coil which would be required in such machine, by a system of short-circuited bar sets in an arrangement the theory of which shows that it may be only a three-phase or a one-phase system.

Figure 5:
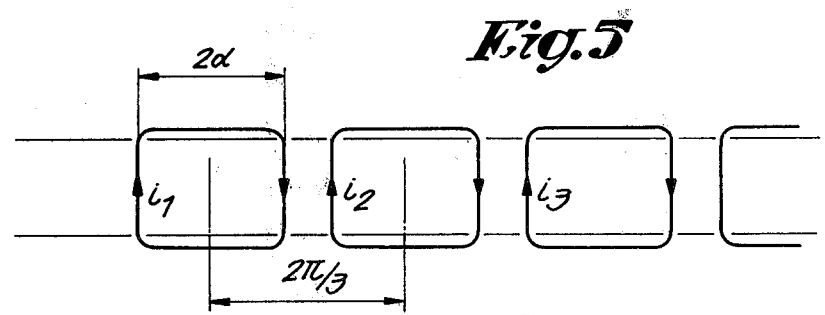

It should be noted that the three-phase system has the substantial advantage of limiting to the maximum the interactions between the inducing and induced coils of the stator (FIG. 5).

On the other hand, the angle $2\alpha$ which translates the spacing between the short-circuited bars, will be selected in accordance with various criteria which will be made optimum only by calculating a machine for a well specified application.

Figure 6:
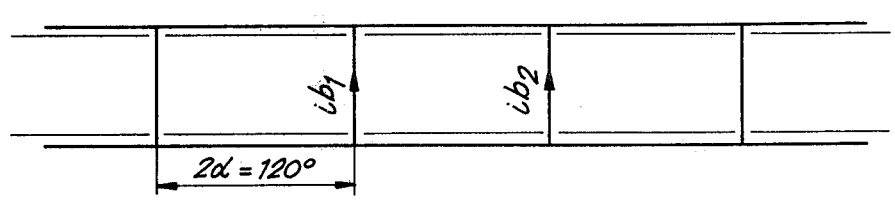

It should be still noted that, in the three-phase system, when $2\alpha$ is selected equal to 120°, two successive bars are merged and the system is reduced to that shown in FIG. 6 in which the spaces between the bars are identical.

The current passing through each bar (ib) is then equal to the vectorial sum of the corresponding three-phase currents $$\vec{i_{b1}} = \vec{i_1} + \vec{i_2}; \quad \vec{i_{b2}} = \vec{i_2} + \vec{i_3} \text{ etc.}$$

$$\text{with } |ib| = \frac{\sqrt{3}}{2} \cdot 2 \cdot |i| = |i|\sqrt{3}$$

That case is a particularly interesting one, since:
  the number of bars is reduced by half;
  the total current through the bars is reduced by about 13%;
  the rotor may be arranged like the rotor of a cage asynchronous motor without insulating the bars from the ground.

This arrangement has been used for the practical example disclosed in FIG. 3. In that case, the induced winding used in the stator is of the two-phase type.

Although the alternator version of the machine according to the invention has been more particularly pointed out in the foregoing, no limitation is to be seen therein.

In fact, in order to construct a synchronous motor FIG. 7, it is possible to connect the said first winding 11 with a multiphase current supply 12, the second winding 13 being connected with a direct current supply 14.

Similarly, in order to obtain an asynchronous motor FIG. 8 (hyposynchronous or hypersynchronous), the said first winding 11 is connected with a supply of multiphase currents 12, while the second winding 13 is conventionally connected with generally passive elements 15 having inherent inductive, capacitive and resistive characteristics for supplying current to winding 13 as a function of motor operation.

In addition, it is possible to obtain an asynchronous synchronized motor FIG. 9 by providing a switch 16 on the supply of the second winding 13, thereby allowing the machine to be started and then fed with direct current, thereby providing for the synchronization thereof.

It is apparent that the invention is not at all limited to the above described examples, since numerous embodiments are possible by acting on the angle $2\alpha$, the selection of the pole pitch for the energization, the configuration of the energizing coil which could be made in a single coil, the total number of pole pairs, the speed, the selection of the type of multiphase stator winding, the possible fastening of the rotor and the utilization of a bar yoke, the foregoing enumeration being not at all limitative.

In the above-mentioned case of an energizing coil made in a single coil, it may be advantageously realized in a single coil the axis of which coincides with that of the machine, said coil being disposed between two identical half-stators which are however angularly offset, thereby forming alternatively poles of contrary names, the magnetic circuit being closed relative to the outside through a suitably disposed magnetic material.

What we claim is:

1. A rotating electrical machine of the type comprising a stationary portion and a moving portion coaxial therewith, said stationary portion including a first and a second winding, and said moving portion including a single phase third winding, said first and second windings having pole pitches even multiples or sub-multiples of each other and a mutual zero inductance, said third winding being alone and closed on itself, the arrangement being such that said first winding generates a field inducing current into said third winding, said current generating a fixed flux in relative rotation with respect to said moving portion which has the same pole pitch as said second winding and magnetically interacts with said second winding, said third winding including a number of bar sets each of which comprise two interconnected bars, said number of bar sets being equal to the number of pole pairs of said first or second winding having the largest pole pitch.

2. A machine according to claim 1 wherein each of said bars of a set are common to two successive bar sets forming a squirrel cage.

3. A machine according to claim 2 wherein said bars are regularly spaced on the periphery of said rotor.

4. A machine according to claim 1 and adapted to operate as a synchronous alternator, comprising: means for connecting said first winding to a direct current supply, and means for obtaining an output electromotive force from said second winding.

5. A machine according to claim 1 and adapted to operate as a synchronous motor, comprising: means for connecting said first winding to a multiphase current supply, and means for connecting said second winding to a direct current supply, said second winding constituting the synchronizing inductor of said machine.

6. A machine according to claim 1 and adapted to operate as an asynchronous motor, comprising: means for connecting said first winding to a multiphase current supply, said second winding constituting the secondary induced winding of said machine.

7. A machine according to claim 1 and adapted to operate as a synchronized asynchronous motor, comprising: means for connecting said first winding to a multiphase current supply, and means for switching said second winding from a secondary induced winding for starting said machine to a direct current energized winding, said machine being thereby synchronized.

8. A machine according to claim 1 wherein the opening angle between said bars is different and results in the superimposition of said bar sets.

9. A synchronous alternator of the type comprising a stator and a single phase rotor coaxial therewith, said stator carrying a first and a second winding, and said rotor a third winding, said first and second windings having pole pitches an even multiple or sub-multiple of each other and a mutual zero inductance, said third winding being alone and closed on itself, the arrangement being such that said first winding generates a field inducing current into said third winding, said current generating a fixed flux in relative rotation with respect to said rotor which has the same pole pitch as said second winding and magnetically interacts therewith, said third winding comprising a number of bar sets, each of which comprises two interconnected bars, said number of bar sets being equal to the number of pole pairs of said stator winding having the largest pole pitch; means for connecting said first winding to a direct current supply; and means for obtaining an output electromotive force from said second winding.

10. A synchronous alternator of the type comprising a stator and a three-phase rotor coaxial therewith, said stator carrying a first and a second winding, and said rotor a third winding, said first and second windings having pole pitches an even multiple or sub-multiple of each other and a mutual zero inductance, said third winding being alone and closed on itself, the arrangement being such that said first winding generates a field inducing current into said third winding, said current generating a fixed flux in relative rotation with respect to said rotor which has the same pole pitch as said second winding and magnetically interacts therewith, said third winding comprising a number of bar sets, each of which comprises two interconnected bars, said number of bar sets being equal to three times said number of pole pairs; means for connecting said first winding to a direct current supply; and means for obtaining an output electromotive force from said second winding.

11. A rotating electrical machine of the type comprising a stationary portion and a moving portion coaxial therewith, said stationary portion including a first and a second winding, and said moving portion including a three-phase third winding, said first and second windings having pole pitches even multiples or sub-multiples of each other and a mutual zero inductance, said third winding being alone and closed on itself, the arrangement being such that said first winding generates a field inducing current into said third winding, said current generating a fixed flux in relative rotation with respect to said moving portion which has the same pole pitch as said second winding and magnetically interacts with said second winding, said third winding including a number of bar sets each of which comprise two interconnected bars, said number of bar sets being equal to three times the number of pole pairs of said first or second winding having the largest pole pitch.

12. A machine according to claim 11 and adapted to operate as a synchronous alternator, comprising: means for connecting said first winding to a direct current supply, and means for obtaining an output electromotive force from said second winding.

13. A machine according to claim 12 and adapted to operate as a synchronous motor, comprising: means for connecting said first winding to a multiphase current supply, and means for connecting said second winding to a direct current supply, said second winding constituting the synchronizing inductor of said machine.

14. A machine according to claim 12 and adapted to operate as an asynchronous motor, comprising: means for connecting said first winding to a multiphase current supply, said second winding constituting the secondary induced winding of said machine.

15. A machine according to claim 12 and adapted to operate as a synchronized asynchronous motor, comprising: means for connecting said first winding to a multiphase current supply, and means for switching said second winding from a secondary induced winding for starting said machine to a direct current energized winding, said machine being thereby synchronized.

16. A machine according to claim 12 wherein the opening angle between said bars is different and results in the superimposition of said bar sets.

* * * * *